(12) United States Patent
Janning

(10) Patent No.: US 9,178,443 B2
(45) Date of Patent: Nov. 3, 2015

(54) ELECTRICAL FREQUENCY CONVERTER FOR COUPLING AN ELECTRICAL POWER SUPPLY GRID WITH AN ELECTRICAL DRIVE

(71) Applicant: GE Energy Power Conversion GmbH, Berlin (DE)

(72) Inventor: Jörg Janning, Berlin (DE)

(73) Assignee: GE ENERGY POWER CONVERSION GMBH, Berlin (DE)

( * ) Notice: Subject to any disclaimer, the term of this patent is extended or adjusted under 35 U.S.C. 154(b) by 367 days.

(21) Appl. No.: 13/672,970

(22) Filed: Nov. 9, 2012

(65) Prior Publication Data

US 2013/0235624 A1    Sep. 12, 2013

(30) Foreign Application Priority Data

Nov. 10, 2011   (DE) .......................... 10 2011 086 087

(51) Int. Cl.
*H02M 1/08*    (2006.01)
*H02M 5/458*   (2006.01)
*H02M 7/483*   (2007.01)

(52) U.S. Cl.
CPC ............ *H02M 5/4585* (2013.01); *H02M 5/458* (2013.01); *H02M 2007/4835* (2013.01)

(58) Field of Classification Search
USPC .................................................. 363/126, 37
See application file for complete search history.

(56) References Cited

U.S. PATENT DOCUMENTS 7,158,393 B2 *   1/2007   Schneider ....................... 363/34
8,223,517 B2 *   7/2012   Kishida et al. .................. 363/67
8,553,440 B1 *  10/2013   Nanut et al. ................... 363/129
9,048,756 B2 *   6/2015   Dong et al. .......................... 1/1
2002/0149953 A1* 10/2002   Smedley et al. ................ 363/84

(Continued)

FOREIGN PATENT DOCUMENTS

CN         102013819        4/2011
WO     WO 2012/072197 A2    6/2012

OTHER PUBLICATIONS

John Salmon et al., An asymmetrical half-bridge active dc filter for industrial drive systems using multi-pulse utility rectifiers with harmonic reducing input transformers, University of Alberta, Edmonton, Alberta, Canada, T6G 2V4.*

(Continued)

*Primary Examiner* — Adolf Berhane
*Assistant Examiner* — Nusrat Quddus
(74) *Attorney, Agent, or Firm* — Parks Wood LLC

(57) ABSTRACT

An electrical frequency converter for coupling an electrical power supply grid with an electrical drive includes a first power converter connected to the power supply grid. The first power converter includes at least two connections in series. A second power converter is connected to the electrical drive and includes at least two connections in series. Each of the connections in series of the first and second power converters includes at least two modular switches. Each modular switch includes a first connection in series having a first controllable power semiconductor component and a first diode. The modular switch further includes a second connection in series having a second controllable power semiconductor component and a second diode. The modular switch further includes a capacitor. The first connection in series, the second connection in series and the capacitor are connected in parallel.

13 Claims, 6 Drawing Sheets

(56) References Cited

U.S. PATENT DOCUMENTS

| | | |
|---|---|---|
| 2005/0083716 A1 | 4/2005 | Marquardt |
| 2007/0121354 A1* | 5/2007 | Jones et al. ............ 363/47 |
| 2008/0205093 A1* | 8/2008 | Davies et al. ............ 363/35 |
| 2008/0232145 A1 | 9/2008 | Hiller et al. |
| 2010/0176850 A1 | 7/2010 | Pereira |
| 2012/0037616 A1* | 2/2012 | Kitahara et al. ............ 219/665 |
| 2012/0063185 A1 | 3/2012 | Janning |
| 2012/0176816 A1* | 7/2012 | Seel et al. ............ 363/21.01 |
| 2013/0194840 A1* | 8/2013 | Huselstein et al. ............ 363/50 |

OTHER PUBLICATIONS

J. Salmon et al., Improving the Operation of 3-phase Diode Rectifiers using Asymmetrical Half-Brdige DC-Link Active Filter, University of Alberta, Edmonton, Alberta T6G2G7.*

EPO Search Report, Apr. 3, 2013.

\* cited by examiner

ELECTRICAL FREQUENCY CONVERTER FOR COUPLING AN ELECTRICAL POWER SUPPLY GRID WITH AN ELECTRICAL DRIVE

FIELD OF THE INVENTION

The present invention relates to an electrical inverter. More specifically, the present invention involves an electrical frequency converter and an electrical network coupling inverter.

BACKGROUND OF THE INVENTION

Electrical frequency converters and electrical network coupling inverters are generally known and are used for connecting two power supply grids. It is also known that electrical network coupling inverters can have a modular design. Therefore, an improved modular design for an electrical network coupling inverter would be useful.

BRIEF DESCRIPTION OF THE INVENTION

Aspects and advantages of the invention are set forth below in the following description, or may be obvious from the description, or may be learned through practice of the invention.

One embodiment of the present invention is an electrical frequency converter for coupling an electrical power supply grid with an electrical drive. The electrical frequency converter includes a first power converter that is connected to the power supply grid. The first power converter includes at least two connections that are in series. A second power converter is connected to the electrical drive. The second power converter includes at least two connections in series. Each of the connections in series of the first and the second power converters includes at least two modular switches. Each modular switch includes a first connection in series and consists of a first controllable power semiconductor component and a first diode. A connection point between the first power semiconductor component and the first diode defines a first connection of the modular switch. Each modular switch further includes a second connection in series. The second connection in series comprises a second controllable power semiconductor component and a second diode. A connection point between the second power semiconductor component and the second diode defines a second connection of the modular switch. The modular switch further includes a capacitor. The first connection in series, the second connection in series and the capacitor are connected in parallel to one another.

Another embodiment of the present invention is an electrical frequency converter for coupling an electric transformer to an electrical drive. The electrical transformer includes at least one rectifier that is connected to the transformer and an inverter that is connected to the electrical drive. The inverter includes at least two connections that are in series. Each connection in series includes at least two modular switches. Each modular switch includes a first connection in series. The first connection in series includes a first controllable power semiconductor component and a first diode. A connection point between the first power semiconductor component and the first diode defines a first connection of the modular switch. The inverter also includes a second connection in series. The second connection in series consists of a second controllable power semiconductor component and a second diode. A connection point between the second power semiconductor component and the second diode defines a second connection of the modular switch. The modular switch also includes a capacitor. The first connection in series, the second connection in series and the capacitor are connected in parallel to one another.

Another embodiment of the present invention is an electric inverter for coupling an electric power supply grid to an electric compensation. The electric inverter includes a rectifier that is connected to the power supply grid and an inductance that is connected to the rectifier. The rectifier includes a number of connections in series that corresponds to a number of phases of the power supply grid. Each of the connections in series includes at least two modular switches. Each modular switch includes a first connection in series. The first connection in series includes one first controllable power semiconductor component and a first diode. A connection point between the first power semiconductor component and the first diode constitutes a first connection of the modular switch. The modular switch further includes a second connection in series that includes a second controllable power semiconductor component and one second diode. A connection point between the second power semiconductor component and the second diode constitutes a second connection of the modular switch. The modular switch also includes a capacitor. The first connection in series, the second connection in series and the capacitor are connected in parallel.

Another embodiment of the present invention is an electrical mains coupling inverter for coupling a first electrical power supply grid to a second electrical power supply grid. The mains coupling inverter includes a first power converter that is connected to the first power supply grid. The first power converter includes at least two connections in series. The mains coupling inverter also includes a second power converter that is connected to the second power supply. The second power converter includes at least two connections in series. Each of the connections in series of the first and second power converters includes at least two modular switches. Each modular switch includes a first connection in series that consists of a first controllable power semiconductor component and a first diode. A connection point between the first power semiconductor component and the first diode defines a first connection of the modular switch. The modular switch further includes a second connection in series that consists of a second controllable power semiconductor component and a second diode. A connection point between the second power semiconductor component and the second diode defines a second connection of the modular switch. The modular switch also includes a capacitor. The first connection in series, the second connection in series and the capacitor are connected in parallel to one another.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
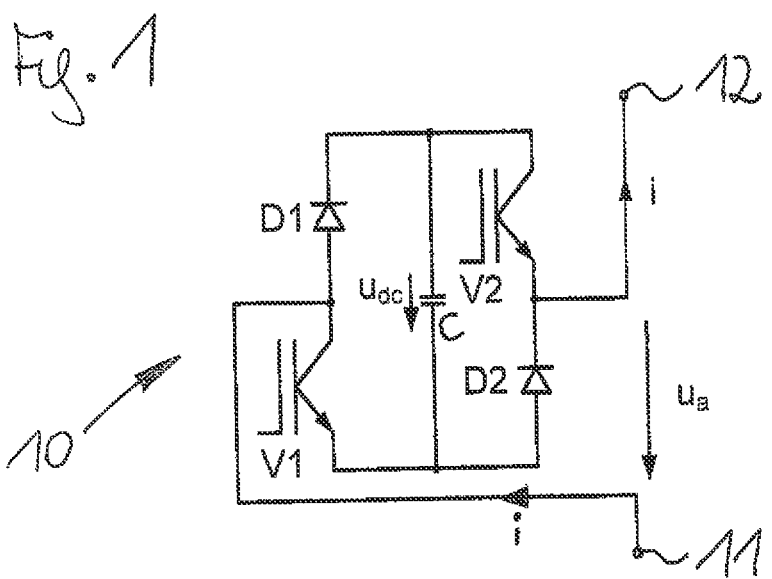
FIG. 1 provides an electrical wiring diagram of an modular electrical switch according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the Figures wherein identical numerals and letters indicate the same elements throughout the Figures, FIG. 1 shows a modular switch 10 that is intended for use in an electrical inverter or in an electrical power converter. The modular switch 10 has a first connection that is in series consisting of a first controllable power semiconductor component V1 and a first diode D1, and a second connection that is in series that consists of a second diode D2 and a second controllable power semiconductor component V2.

A free-wheeling diode switched in opposite direction can be connected in parallel to each one of the two controllable power semiconductor components V1, V2. It is intended that the modular switch 10 is fully functional without the free-wheeling diodes. In practice, however, such free-wheeling diodes are intended for protecting the power semiconductor components V1, V2. The free-wheeling diodes help to prevent possible damage to the power semiconductor components V, V2 if power direction is accidentally reversed. Free-wheeling diodes can also have advantages for the protective functions of the inverter built with the modular switch 10. For this reason, FIGS. 2 to 6 (described below) include such free-wheeling diodes. Moreover, one diode connected in series in the same direction can be connected to each one of the two controllable power semiconductor components V1, V2 for the purpose of increasing blocking capacity in opposite direction.

The dimensioning or size of the power semiconductor components V1, V2 and the diodes of the modular switch 10 can be optimized by taking into account the loads that occur with the respective application. The power semiconductor components V1, V2 and the diodes can be built from several components connected in parallel and/or in series.

In the first connection in series, the collector of the first power semiconductor component V1 and the anode of the first diode D1 are connected to one another. This connection point is named first connection 11. In the second connection in series, the emitter of the second power semiconductor component V2 and the cathode of the second diode D2 are connected to one another. This connection point is named second connection 12.

The two connections in series are connected in parallel to each other. Thus, the cathode of the first diode D1 is connected to the collector of the second power semiconductor component V2, and the emitter of the first power semiconductor component V1 to the anode of the second diode D2.

A capacitor C has been connected to the two connections in series connected in parallel. The capacitor C can also be built as a capacitor bank consisting of several capacitors connected in parallel and/or in series.

There is a DC voltage Udc on the capacitor C and a connecting voltage Ua between both connections 11, 12. The direction of the voltages Udc and Ua, is indicated in FIG. 1. In addition, a current i flows from the first connection 11 towards the second connection 12.

The power semiconductor components V1, V2 are controllable switches (e.g. transistors). For example, the power semiconductor components V1, V2 may comprise field effect transistors (FETs), thyristors with the necessary auxiliary wiring if need be, GTO thyristors (GTO=gate turn off), IGBTs (IGBT=insulated gate bipolar transistor), or comparable electronic components. Their connections can have different names depending on the design of the power semiconductor components V1, V2. The two names given above (collector and emitter) refer to the exemplary usage of IGBTs. The capacitor C can be unipolar.

The modular switch 10 can take four states. A first state occurs when the two power semiconductor components V1, V2 are turned off (block) and the current i flows from the first connection 11 through the diode D1. The current i then flows through the capacitor C and through the diode D2 to reach the second connection 12. The capacitor C is charged by this current i. As a result, the DC voltage Udc increases. Apart from the voltage drops in the diodes D1, D2, the connection voltage Ua equals the negative DC voltage −Udc, therefore Ua=−Udc.

A second state occurs when the two power semiconductor components V1, V2 are turned on (conduct) and the current i flows from the first connection 11 through the first power semiconductor component V1, through the capacitor C and then through the second power semiconductor component V2 to reach the second connection 12. The capacitor C is discharged by this current i. As a result, the DC voltage Udc decreases. Apart from the voltage drops in the power semiconductor components V1, V2, the connection voltage Ua equals the positive DC voltage Udc, therefore Ua=Udc.

A third state occurs when the first power semiconductor component V1 is turned on (conducts) and the second power semiconductor component V2 is turned off (blocks). The current i flows from the first connection 11 through the first power semiconductor component V1 and through the second diode D2 to the second connection 12. As a result, the DC voltage Udc across the capacitor C remains constant. Apart from the voltage drops in the first power semiconductor component V1 and the second diode D2, the connection voltage Ua equals zero, therefore Ua=0.

A fourth state occurs when the power semiconductor component V1 is turned off (blocks) and the second power semiconductor component V2 is turned on (conducts). The current i flows from the first connection 11 through the first diode D1 and the second power semiconductor component V2 to the second connection 12. As a result, the DC voltage Udc across the capacitor C remains constant. Apart from the voltage drops in the first diode D1 and the second power semiconductor component V2, the connection voltage Ua equals zero, therefore Ua=0.

The current i flowing through the modular switch 10 always flows in the same direction, which is preset by the diodes D1, D2. The connection voltage Ua may essentially have three values, for example Ua=−Udc or Ua=Udc or Ua=0. The DC voltage Udc across the capacitor C may become larger or smaller.

The third and fourth states of the modular switch 10 mentioned previously, in which the connection voltage Ua equals zero, can be used for the purpose of homogenizing the load of the power semiconductor components and diodes.

Figure 2:
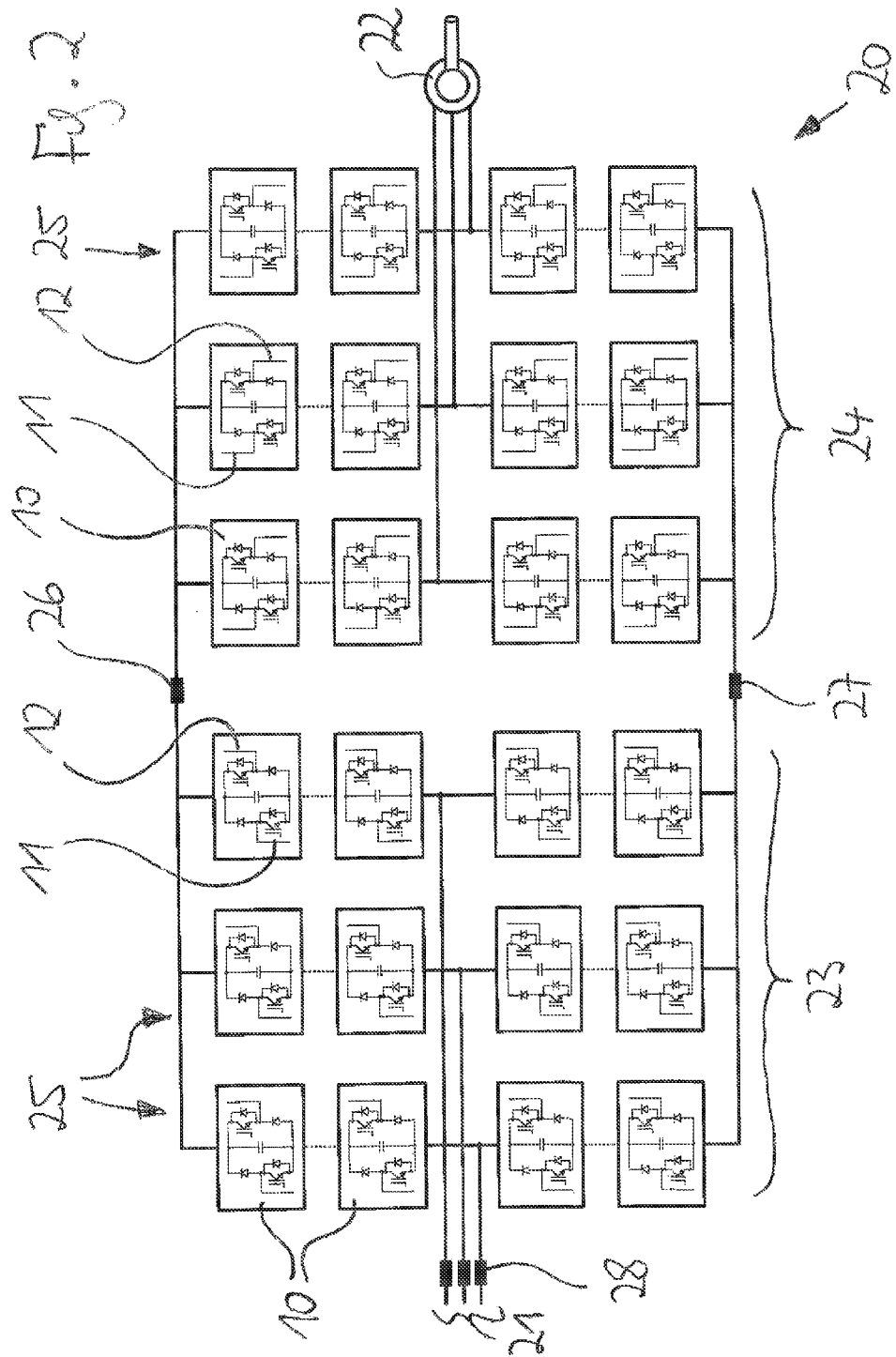
FIG. 2 provides an electrical wiring diagram of an electrical frequency converter that uses a modular switch as shown in FIG. 1, according to one embodiment of the present invention.

FIG. 2 shows an electric frequency converter 20 intended for coupling an electric power supply grid 21 with an electric drive 22. In particular embodiments, the electric drive 22 comprises an electric motor. However, it should be obvious to one of ordinary skill that any other type of electric (especially electromagnetic) load can be used. Likewise, a generator also may be used as the electric drive 22.

The frequency converter 20 has a first power converter 23 and a second power converter 24, both designed in three phases. In this case, it is assumed that the electric drive 22 is impinged or provided with electric energy by the power supply grid 21. For this reason, the first power converter 23 has a rectifying function and will therefore also be known as rectifier below. The second power converter 24 has an inverting function and will therefore also be known as inverter below.

The two power converters 23, 24 are multilevel or multipoint power converters that in this case have five working points. It is obvious that both converters 23, 24 can also be equipped with fewer or more working points and/or with a different number of working points. It should also be obvious that the two power converters 23, 24 can have fewer or more phases and that the two power converters 23, 24 can also have a different number of phases.

In this case, as shown in FIG. 2, each one of the two power converters 23, 24 is built of three connections in series 25 connected in parallel, in which case every one of the connections in series 25 consists of four modular switches 10 connected in series. In the power converter 23, the connection 11 of every one of the switches 10 is connected to the connection 12 of the corresponding switch 10 arranged underneath. In the power converter 24, the connection 12 of every one of the switches 10 is connected to the connection 11 of the corresponding switch 10 arranged underneath.

Furthermore, the connections 12 of the first, uppermost switches 10 of the rectifier 23 are connected to the one connection of an intermediate circuit inductance 26 and the connections 11 of the fourth, lowest switches 10 to a connection of an intermediate circuit inductance 27. The connections 12, 11 of the first (uppermost) and fourth (lowest) switches 10 of the inverter 24 to each of the other respective connections of the intermediate circuit inductances 26, 27 are made in corresponding fashion.

An intermediate circuit DC voltage is applied between the two intermediate circuit inductances 26, 27, through which the course of the associated intermediate circuit current can be adjusted. It is pointed out that, if necessary, only one of the two intermediate circuit inductances 26, 27 can also be available.

The connection point of the two middle switches 10 of each of the three connections in series 25 of the rectifier 23 is connected, in each case via one inductance 28, to one of the three phases of the power supply grid 21.

Alternatively, the three inductances 28 can also be designed in the shape of a transformer, if necessary also as so-called open transformer windings. In the latter case, it may be necessary to adapt the rectifier 23.

The connection point of the two middle switches 10 of every one of the three connections in series 25 of the converter 24 is connected to one of the three phases of the electrical drive 22. In this case, it is assumed that the electrical drive 22 has phase-related inductances. In an electrical motor, this can refer to its windings.

As previously described, the connection voltage Ua of every modular switch 10 can essentially have three states: Ua=−Udc or Ua=Udc or Ua=0, so the voltage of every phase of the electric drive 22 can essentially have five states, namely −2 Udc or −Udc or 0 or Udc or 2 Udc.

By respectively controlling the power semiconductor components V1, V2 of the individual modular switches 10 of the converter 24, the AC voltage of the power supply grid 21 having an initial frequency is converted to the intermediate circuit DC voltage. Through the corresponding control of the power semiconductor components V1, V2 of the individual modular switches 10 of the inverter 25, the intermediate circuit DC voltage is converted to AC voltage applied on the drive 22 with a selected second frequency.

As already mentioned, the electric drive 22 can also be a generator. In this case, reverse feeding takes place in which the second power converter 24 has a rectifying function and the first power converter 23 an inverting function. The intermediate circuit voltage changes its polarity sign. By correspondingly controlling the power semiconductor components V1, V2 of the individual modular switches 10 of the two power converters 23, 24, an alternate current produced by the generator with an initial frequency is converted to an alternate voltage available in a power supply grid 21 with a preset second frequency.

The frequency converter 20 shown in FIG. 2 is a five-point inverter. Contrary to FIG. 2, only two modular switches 10 are needed for a three-point inverter in every one of the connections in series 25 of the rectifier 23 and the inverter 24.

Figure 3:
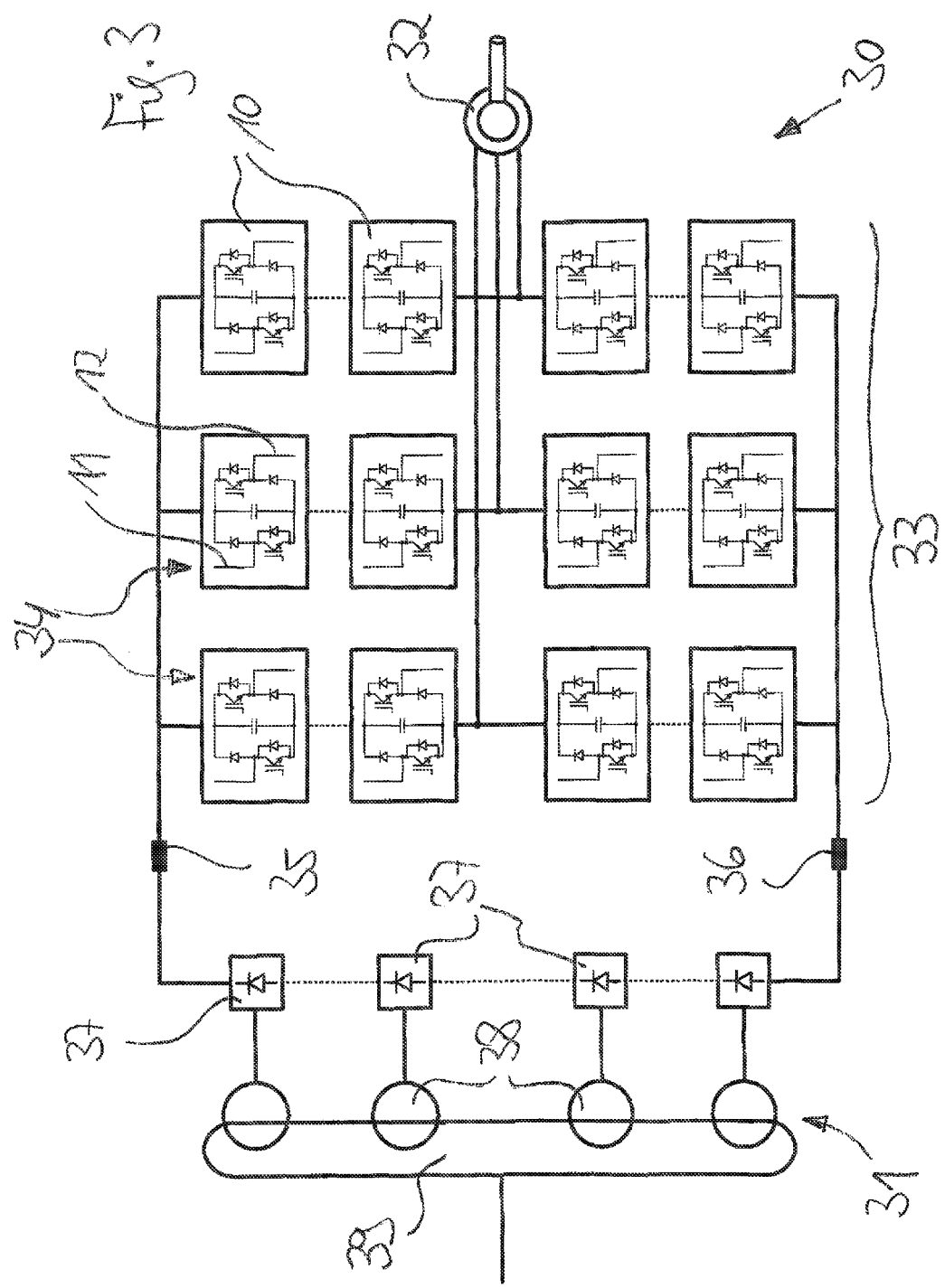
FIG. 3 provides an electrical wiring diagram of an electrical frequency converter with a diode feed that uses the modular switch as shown in FIG. 1, according to one embodiment of the present invention.

FIG. 3 shows an electric frequency converter 30 intended for coupling to an electric transformer 31 with an electric drive 32. An electric motor is especially intended as electric drive 32, but it must be pointed out that any other kind of electric load—especially an electromagnetic load—can be used instead of the electric motor.

As shown in FIG. 3, the frequency converter 30 has an inverter 33 built from three connections in series 34 and connected in parallel, in which case every one of the connections in series 34 is made up of four modular switches 10 connected in series. The connection 12 from every one of the switches 10 is connected to the connection 11 of the respective switch 10 arranged underneath.

The inverter 33 is executed in three phases. The inverter 33 can also have fewer or more phases. The inverter 33 is a multilevel or multipoint converter that in this case has five working points. The inverter 33 can also be equipped with fewer or more working points. Furthermore, the connections 11 of the first, uppermost switch 10 of the inverter 33 is connected to a connection of an intermediate circuit inductance 35 and the connections 12 of the fourth, lowest switches 10 to the one connection of an intermediate circuit inductance 36. The other respective connection of the intermediate circuit inductances 35, 36 is connected to a connection in series of a number of rectifiers 37. The connection in series of the rectifiers 37 is thus connected in parallel to the connections in series 34 of the inverter 33. If necessary, only one of the two intermediate circuit inductances 35, 36 may be used. In this case, there are four rectifiers 37 available however, this number can be larger or smaller.

Every one of the rectifiers 37 connected in series is connected to one secondary-side winding 38 of the transformer 31. Thus, there are four secondary-side windings here. Furthermore, the transformer 31 has one primary-side winding 39 that can be connected to one power supply grid, for example. In one embodiment, the transformer 31 is executed in three phases However, the transformer 31 can have a smaller or larger number of phases.

The rectifiers 37 can have any kind of electric circuit with which a so-called diode feed-in can be carried out. It is thus possible for the rectifiers 37 to be bridge rectifiers, so-called B2 rectifiers, for example. In a B2 rectifier, two diodes connected in series in the same direction are connected in parallel to one another and the connection points of the two respective diodes are in each case connected to one of the two connection points of the associated secondary-side winding.

The connection points of both connections in series then constitute the connection points of the B2 rectifier. Likewise, it is possible for the rectifiers 37 to be three-phase rectifiers or so-called B6 rectifiers. It should be obvious to one of ordinary skill that any other kind of rectifiers may be used such as for example, half- or fully controlled bridges or the like. Alternatively, thyristor bridges (for example, a so-called B6 thyristor bridge) can also be used. Such thyristor bridges allow a reversal of energy flow also know as reverse feeding.

The connection point of the two middle switches 10 of every one of the three connections in series 34 of the inverter 33 is connected to one of the three phases of the electric drive 32. It is especially assumed here that the electric drive 32 has phase-related inductances. For example, in an electric motor, the phase-related inductances can be its windings.

As explained above, the connection voltage Ua of every modular switch 10 can essentially have three states: Ua=−Udc or Ua=Udc or Ua=0. Thus, the voltage of each phase of the electric drive 32 can have essentially five states, namely: −2 Udc or −Udc or 0 or Udc or 2 Udc.

As shown in FIG. 3, starting from the transformer 31 on which an AC voltage has been applied with an initial frequency, an intermediate circuit voltage is formed between the intermediate circuit inductances 35, 36 with the help of the rectifiers 37.

With them, and through a corresponding control of the power semiconductor components V1, V2 of the individual modular switches 10 of the inverter 33, an intermediate circuit DC voltage preset by the transformer 31 can be converted to an AC voltage applied on the drive 32 with a preset second frequency. In one embodiment, the frequency converter 30 of FIG. 3 is a five-point converter. Contrary to FIG. 3, only two modular switches 10 in every one of the connections in series 34 of the inverter 33 are needed for a three-point converter.

Figure 4:
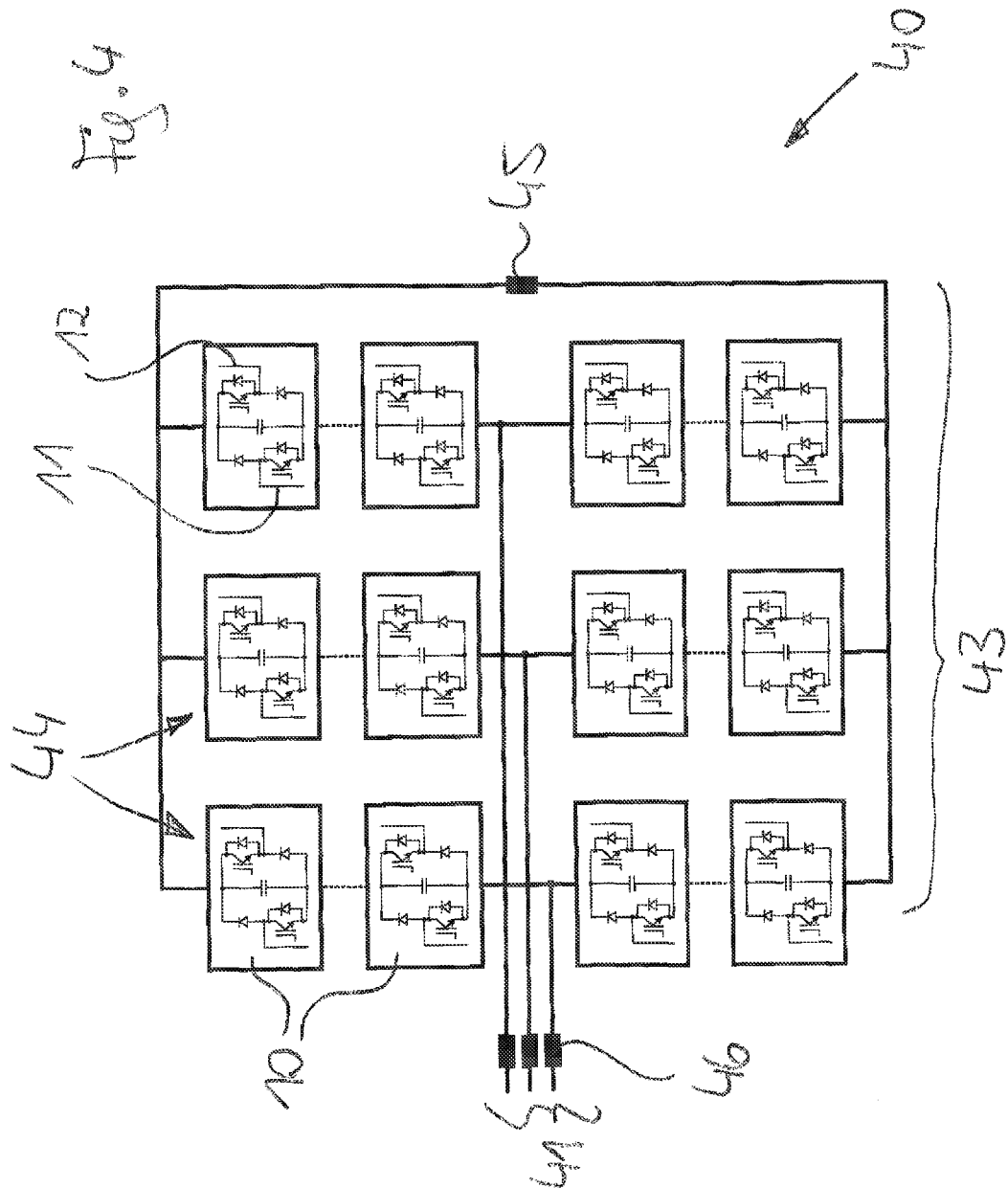
FIG. 4 provides an electrical wiring diagram of a dynamic compensation with an electrical inverter that uses the modular switch as shown in FIG. 1, according to one embodiment of the present invention.

FIG. 4 shows an electric inverter 40 intended for coupling to an electric power supply grid 41 with an electric compensation. The inverter 40 has a rectifier 43 built from three connections in series 44 connected in parallel, whereby every one of the connections in series 44 consist of modular switches 10 connected in series. The connection 11 of every one of the switches 10 is connected to the connection 12 of the respective switch 10 arranged underneath. The rectifier 43 has been developed in three phases. The rectifier 43 can also have fewer or more phases.

The rectifier 43 is a multilevel or multipoint converter that in this case has five working points. The rectifier 43 can be equipped with fewer or more working points. Furthermore, the connections 12 of the first, uppermost switches 10 of the rectifier 43 are connected to the one connection of an inductance 45 and the connections 11 of the fourth, lowest switches 10 are connected to the other connection of the inductance 45. DC voltage has been applied to the inductance 45.

The inductance 45 connected to the intermediate circuit allows the inverter 40 to be used for the dynamic compensation of idle power in the power supply grid 41. The current flows in only one direction through the inductance 45. With the help of the inverter 40, the voltage on the inductance 45 can be positively or negatively set and used for regulating the current. The connection point of the two middle switches 10 of every one of the three connections in series 44 of the rectifier 43 is in each case connected to one of the three phases of the power supply grid 41 through the respective inductance 46.

Alternatively, the three inductances 46 can also be executed in the shape of a transformer, if necessary also as so-called open transformer windings. In the latter case, it may be necessary to adapt the rectifier 43. By respectively controlling the power semiconductor components V1, V2 of the individual modular switches 10 of the rectifier 43, the AC voltage of the power supply grid 41 is converted to the DC voltage applied on the inductance 45. The inverter 40 shown in FIG. 4 is a five-point converter. However, contrary to FIG. 4, only two modular switches 10 are necessary in every one of the connections in series 44 of the rectifier 43 for a three-point converter.

Figure 5:
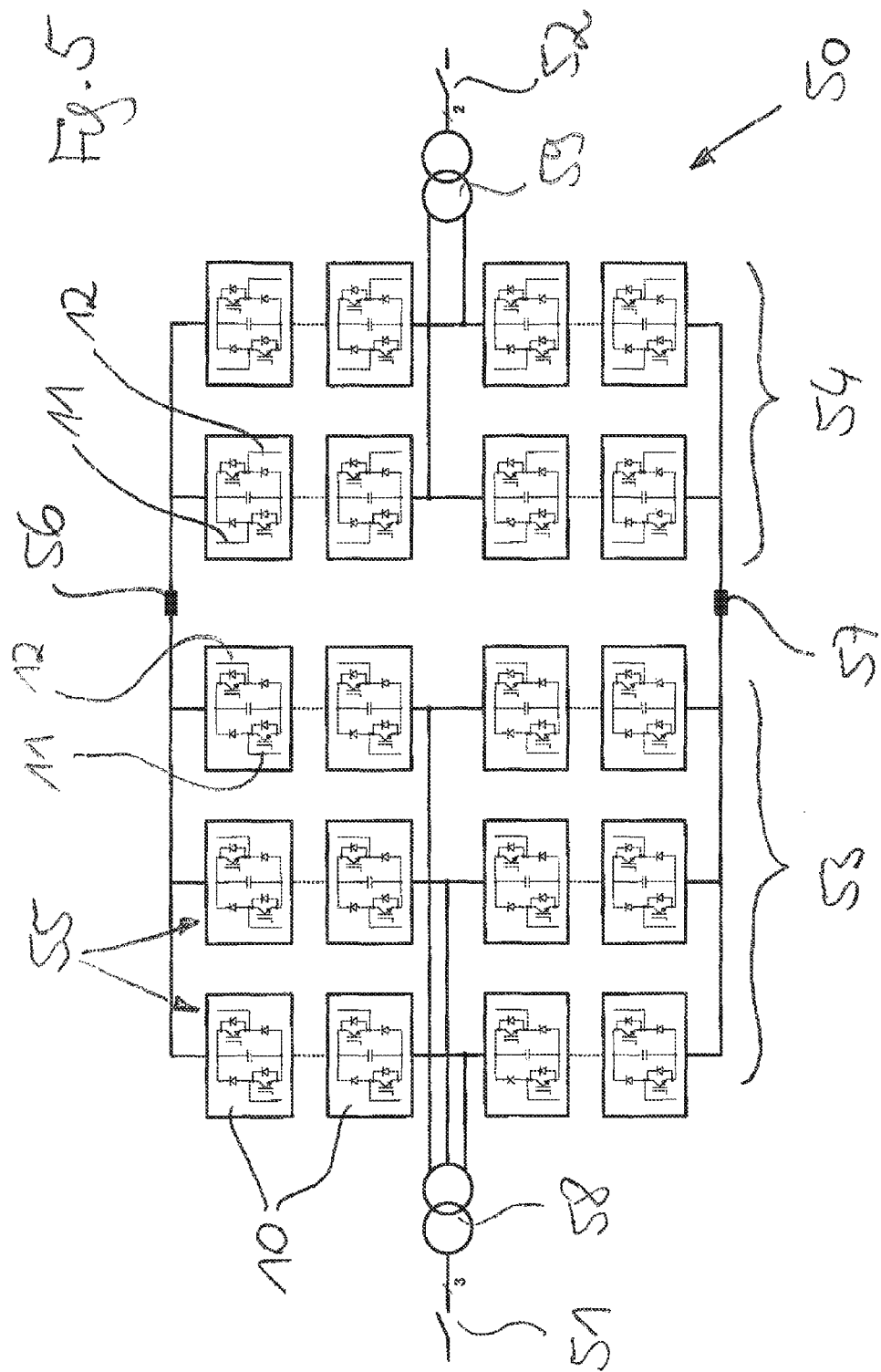
FIG. 5 provides an electrical wiring diagram of an electrical network coupling inverter that uses the modular switch as shown in FIG. 1, according to one embodiment of the present invention.

FIG. 5 shows one electric mains coupling inverter 50 intended for coupling two electric power supply grids 51, 52 that have a different number of phases. For example, the first power supply grid 51 can be the conventional three-phase consumer mains and the second power supply grid 52 can be the two-phase rail grid. In this case, the consumer grid usually has a first frequency of 50 Hz and the rail grid usually a second frequency of 16.7 Hz.

In one embodiment, the mains coupling inverter 50 has a first power converter 53 and a second power converter 54. In this case, it is assumed that the second power supply grid 52 is supplied with electricity by the first power supply grid 51. For this reason, the first power converter 53 has a rectifying function and therefore also receives the name of rectifier below. The second power converter 54 has an inverting function and therefore also receives the name of inverter. The rectifier 53 and the inverter 54 have a different number of phases. Here, the rectifier 53 has three phases and the inverter 54 two phases. The rectifier 53 and/or the inverter 54 can also have fewer or more phases.

The two power converters 53, 54 are multilevel or multipoint converters and may have five working points. The two power converters 53, 54 can also be equipped with fewer or more working points and/or with a different number of working points.

Both power converters 53, 54 are built from connections in series 55 that are connected in parallel, in which case the number of connections in series 55 corresponds in each case to the number of associated phases. Every one of the connections in series 55 consists of four modular switches 10 connected in series. In power converter 53, the connection 11 of every switch 10 is connected to the connection 12 of the respective switch 10 arranged underneath. In power converter 54, the connection 12 of every one of the switches 10 is connected to the connection 11 of the corresponding switch 10 arranged underneath.

The connections 12 of the first (uppermost) switches 10 of the rectifier 53 are connected to a connection of an intermediate circuit inductance 56 and the connections 11 of the fourth (lowest) switches 10 are connected to the one connection of an intermediate circuit inductance 57. Accordingly, the connections 12, 11 of the first (uppermost) and the fourth (lowest) switches 10 of the inverter 54 are connected in each case to the other connection of the intermediate circuit inductances 56, 57. An intermediate circuit DC voltage has been applied between both intermediate circuit inductances 56, 57. Only one of the two intermediate circuit inductances 56, 57 may be used if necessary.

The connection point of the two middle switches 10 of every one of the three connections in series 55 of the rectifier 53 is connected to one of the three phases of the first power supply grid 51. This connection can take place through a transformer 58 or, if necessary, through the respective inductances as well. The connection point of the two middle switches 10 of every one of the two connections in series 55 of the inverter 54 is connected to one of the two phases of the second power supply grid 52. This connection can take place through a transformer 59 or, if need be, also through the respective inductances as well. If necessary, only one of the two transformers 58, 59 can be used.

As previously explained, the connection voltage Ua of every modular switch 10 can essentially have three states: Ua=−Udc or Ua=Udc or Ua=0. Thus, the voltage of every phase can basically have five states, namely: −2 Udc or −Udc or 0 or Udc or 2 Udc.

By correspondingly controlling the power semiconductor components V1, V2 of the individual modular switches 10 of the rectifier 53, the AC voltage of the first power supply grid 51 that has a first frequency is converted to the intermediate circuit DC voltage. By correspondingly controlling the power semiconductor components V1, V2 of the individual modular switches 10 of the inverter 54, the intermediate circuit DC voltage is converted to AC voltage with a preset second frequency for the second energy supply grid 52.

Energy flow also may take place in reverse direction in the mains coupling inverter 50. In this case, reverse feeding—in which the second power converter 54 has a rectifying function and the second power converter 53 has an inverting function—takes place. The intermediate circuit voltage changes its polarity sign. By correspondingly controlling the power semiconductor components V1, V2 of the individual modular switches 10 of the two power converters 53, 54, an existing AC voltage with a first frequency on the second power supply grid 52 is converted to an existing AC voltage on the first power supply grid 51 with a preset second frequency.

In one embodiment, the mains coupling inverter 50 shown in FIG. 5 is a five-point converter. Contrary to FIG. 5, only two modular switches 10 in every one of the connections in series 55 of the rectifier 53 and the inverter 54 are needed for a three-point converter.

Figure 6:
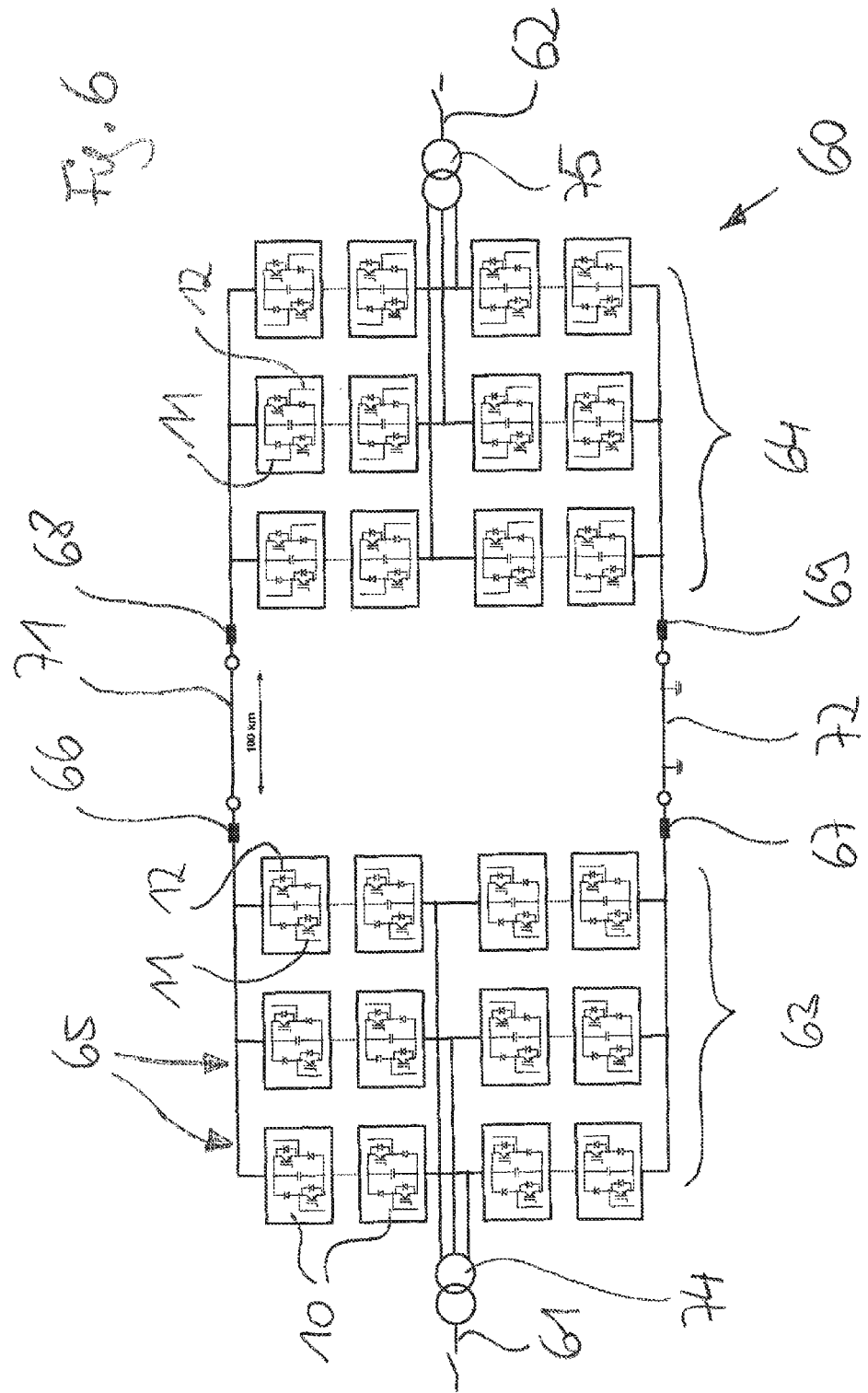
FIG. 6 provides an electrical wiring diagram of an electrical network coupling inverter with DC transmission that uses the modular switch as shown in FIG. 1, according to one embodiment of the present invention.

FIG. 6 shows an electric mains coupling inverter 60 intended for coupling two electric power supply grids 61, 62 with DC current transmission arranged in between. As shown, the mains coupling inverter 60 has a first power converter 63 and a second power converter 64. Here, it is assumed that the second power supply grid 62 is supplied with electric power by the first power supply grid 61. For this reason, the first power converter 63 has a rectifying function and also receives the name of rectifier below and the second power converter 64 has an inverting function and therefore also receives the name of inverter.

Both power converters 63, 64 have the same number of phases. Here, the rectifier 63 and the inverter 64 are executed in three phases. The rectifier 63 and/or the inverter 64 can have fewer or more phases and also a different number of them. Both power converters 63, 64 are multilevel or multipoint converters that in this case have five working points. The two power converters 63, 64 can also have fewer or more working points and/or be equipped with a different number of working points. In this case, the rectifier 63 and the inverter 64 are in each case made up of connections in series 65 connected in parallel, and the number of connections in series 65 corresponds in each case to the number of associated phases. Every one of the connections in series 65 consists of four modular switches 10 connected in series. In the rectifier 63, the connection 11 of every one of the switches 10 is connected to the connection 12 of the corresponding switch 10 arranged underneath. In the inverter 64, the connection 12 of every one of the switches 10 is connected to the connection 11 of the corresponding switch arranged underneath.

The connections 12 of the first (uppermost) switch 10 of the rectifier 63 is connected to one connection of an inductance 66 and the connections 11 of the fourth (lowest) switches 10 are connected to a connection of an inductance 67. The connections 12, 11 of the first (uppermost) and of the fourth (lowest) switches 10 of the inverter 64 are connected accordingly in each case to a connection of an inductance 68, 69.

The other connection of the inductance 66 is connected to the other connection of the inductance 68 via an electric line 71 and the other connection of the inductance 67 is connected to the other connection of the inductance 69 via an electric line 72. DC voltage may be applied between the two electric lines 71, 72, especially high voltage (e.g. 150 kV). These two lines can be several kilometers long (e.g. 100 km). One of the two lines 71, 72 can be grounded. The transmission of DC current is accomplished in this way.

It should be pointed out that either one of the two lines 71, 72 can, if necessary, also be allocated to only one of the two inductances 66, 68 or 67, 69. If applicable, one can also do entirely without the inductances 66, 68, 67, 69 as long as the inductances of the electric lines 71, 72 are large enough.

The connection point of the two middle switches 10 of every one of the three connections in series 65 of the rectifier 63 is connected to one of the three phases of the first power supply grid 61. This connection can take place through a transformer 74 or, if need be, also through the respective inductances. The connection point of the two middle switches 10 of every one of the three connections in series 65 of the inverter 64 is connected to one of the three phases of the second power supply grid 62. This connection can take place through a transformer 75 or, if need be, also through the corresponding inductances. If necessary, only one of the two transformers 74, 75 can be used.

As previously explained above, the connection voltage Ua of every modular switch 10 can essentially have three states: Ua=−Udc or Ua=Udc or Ua=0. Thus, the voltage of every phase can essentially have five states, namely: −2 Udc or −Udc or 0 or Udc or 2 Udc.

By correspondingly controlling the power semiconductor components V1, V2 of the individual modular switches 10 of the rectifier 63, the AC voltage with the one first frequency of the first power supply grid 61 is converted to DC voltage. This DC voltage or the associated DC current is then transmitted over the lines 71, 72. By correspondingly controlling the power semiconductor components V1, V2 of the individual modular switches 10 of the inverter 64, the DC voltage is converted to an AC voltage with a preset second frequency for the second energy supply grid 62.

It should be pointed out that energy can flow in reverse direction in the mains coupling inverter 60. In this case, reverse feeding takes place in which the second power converter 64 performs a rectifying function and the first power converter 63 an inverting function. By correspondingly controlling the power semiconductor components V1, V2 of the individual modular switches 10 of the two power converters 63, 64, an AC voltage available on the second power supply grid 62 is converted with a first frequency to DC voltage and transmitted through the lines 71, 72 so that it can then be converted to an existing AC voltage on the first energy supply grid 61 with a preset second frequency.

The mains coupling inverter 60 shown in FIG. 6 is a five-point converter. However, contrary to FIG. 6, only two modular switches 10 are necessary for every one of the connections in series 65 of the rectifier 63 and the inverter 64. It should additionally be pointed out that the mains coupling inverter 60 shown in FIG. 6 can also be provided without the electric lines 71, 72. In this case, the mains coupling inverter 60 is a so-called short coupling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An electrical frequency converter for coupling an electrical power supply grid with an electrical drive, comprising:
    a first power converter connected to the electrical power supply grid, the first power converter having at least two connections in series;
    a second power converter connected to the electrical drive, the second power converter having at least two connections in series; and
    the first and the second power converters each comprising a plurality of modular switches, each modular switch of the plurality of modular switches comprising:
        a first connection in series comprising a first controllable power semiconductor component and a first diode coupled at a first connection point, the first connection point defining a first connection of each modular switch;
        a second connection in series comprising a second controllable power semiconductor component and a second diode coupled at a second connection point, the second connection point defining a second connection of each modular switch;
        a capacitor; wherein the first connection in series, the second connection in series and the capacitor are connected in parallel to one another; and
        wherein the number of connections in series of the first power converter corresponds to the number of phases of the electrical power supply grid, and the number of connections in series of the second power converter corresponds to the number of phases of the electrical drive.

2. The electrical frequency converter as in claim 1, further comprising an AC voltage supplied to the electrical frequency converter from the electrical power supply grid at a first frequency, wherein the AC voltage is supplied to the electrical drive from the electrical frequency converter at a second frequency.

3. The electrical frequency converter as in claim 1, wherein the first power converter and the second power converter are connected via at least one intermediate circuit inductance.

4. The electrical frequency converter as in claim 1, wherein the first power converter is connected to the electrical power supply grid via an inductance.

5. An electrical frequency converter for coupling an electric transformer with an electrical drive, comprising:
    at least one rectifier connected to the transformer; and
    an inverter connected to the rectifier and the electrical drive, the inverter having at least two connections in series, each connection in series including a plurality of modular switches, each modular switch of the plurality of modular switches comprising:
        a first connection in series comprising a first controllable power semiconductor component and a first diode coupled at a first connection point, the first connection point defining a first connection of each modular switch;
        a capacitor;
        wherein the first connection in series, the second connection in series and the capacitor are connected in parallel to one another; and
        wherein the number of connections in series corresponds to a number of phases of the electrical drive.

6. The electrical frequency converter as in claim 5, wherein the transformer and the inverter are connected via at least one intermediate circuit inductance.

7. The electrical frequency converter as in claim 5, further comprising an AC voltage that is supplied from the transformer to the electrical frequency converter at a first frequency, wherein the AC voltage is supplied from the electrical frequency converter to the electrical drive at a second frequency.

8. An electric inverter for coupling an electric power supply grid to an electric compensation, comprising:
    a rectifier connected to the electrical power supply grid and an inductance connected to the rectifier, the rectifier having a number of connections in series that corresponds to a number of phases of the electrical power supply grid, wherein each of the connections in series includes a plurality of modular switches, wherein each modular switch includes:
        a first connection in series comprising a first controllable power semiconductor component and a first diode coupled at a first connection point, the first connection point defining a first connection of each modular switch;
        a second connection in series comprising a second controllable power semiconductor component and a second diode coupled at a second connection point, the second connection point defining a second connection of each modular switch;
        a capacitor; and
        wherein the first connection in series, the second connection in series and the capacitor are connected in parallel.

9. The electric inverter as in claim 8, wherein the rectifier is connected to an energy supply grid via an inductance.

10. An electrical mains coupling inverter for coupling a first electrical power supply grid to a second electrical power supply grid, comprising;

a first power converter connected to the first electrical power supply grid, the first power converter having at least two connections in series;

a second power converter connected to the second electrical power supply grid, the second power converter having at least two connections in series; and wherein each of the connections in series of the first and second power; converters includes a plurality of modular switches, wherein each modular switch comprising:

a first connection in series comprising a first controllable power semiconductor component and a first diode coupled at a first connection point, the first connection point defining a first connection of each modular switch;

a second connection in series comprising a second controllable power semiconductor component and a second diode coupled at a second connection point, the second connection point defining a second connection of each modular switch;

a capacitor; and wherein the first connection in series, the second connection in series and the capacitor are connected in parallel to one another; and wherein the first power converter includes a number of the connections in series that corresponds to a number of phases of the first electrical power supply grid, and the second power converter includes a number of the connections in series that corresponds to a number of phases of the second electrical power supply grid.

11. The electrical mains coupling inverter as in claim 10, wherein the first power converter is connected to the second power converter via at least one inductance.

12. The electrical mains coupling inverter as in claim 10, wherein the first power converter is connected to the second power converter via an electrical line.

13. The electrical mains coupling inverter as in claim 10, wherein at least one inductance is allocated to the electrical line.

* * * * *